United States Patent

[11] 3,593,052

[72] Inventor Leslie L. Hoffman
 Los Angeles, Calif.
[21] Appl. No. 850,713
[22] Filed Aug. 18, 1969
[45] Patented July 13, 1971
[73] Assignee Vernitron Corporation
 New York, N.Y.

[54] DYNAMOELECTRIC MACHINE COMMUTATOR WITH COIL END SLATS AND METHOD OF MAKING SAME
 3 Claims, 5 Drawing Figs.
[52] U.S. Cl. ................................................. 310/234, 310/236
[51] Int. Cl. ............................................. H02k 13/04
[50] Field of Search ..................................... 29/597; 310/233, 234, 235, 236

[56] References Cited
UNITED STATES PATENTS
| | | | |
|---|---|---|---|
| 1,240,806 | 9/1917 | Apple | 310/236 X |
| 1,875,204 | 8/1932 | Apple | 29/597 X |
| 2,188,423 | 1/1940 | Andrews | 29/597 |
| 2,316,651 | 4/1943 | Moeller | 310/235 |
| 2,387,885 | 10/1945 | Davis | 310/233 |
| 2,400,902 | 5/1946 | Allen | 310/234 X |
| 3,182,217 | 5/1965 | Quinn | 310/235 |

Primary Examiner—D. X. Sliney
Assistant Examiner—R. Skudy
Attorney—Edward H. Loveman ABSTRACT: Fine coil wire ends from an armature are connected to a metal commutator ring by first cutting fine diagonal slots in the ring at the corner of the outer face and periphery thereof, one slot for each wire end. The fine wire ends are then inserted in their corresponding slots, and such wire end is welded in place under heat and pressure, by placing the ring on an annular electrode and applying another electrode to the face of the ring sequentially at each slot, while conducting welding current between such electrodes thereby causing the metal adjacent each slot to fuse. Thus, upon removal of electrodes the fused metal cools and solidifies, leaving the fine wire terminals connected to the ring.

PATENTED JUL 13 1971  3,593,052

INVENTOR
LESLIE L. HOFFMAN
BY Edward N. Loveman
ATTORNEY

DYNAMOELECTRIC MACHINE COMMUTATOR WITH COIL END SLATS AND METHOD OF MAKING SAME

This invention relates to electric machines, and more particularly to the construction and assembly of a commutator to the armature of an electric motor.

In the prior art, the copper coil leads from an armature were connected to the commutator ring of a motor, by soldering the terminal ends of such leads in individual holes provided therefor in the ring. Such holes radiated from the inside of the ring and were intersected by the wire terminal ends, which extended through elongated slots leading into the holes from the opposite faces of the ring. The wire coil leads were inserted in the slots, and soldered in place by means of solder deposited in each of the radial holes. Such prior art operation was a very time consuming procedure, which was subject to failure at the solder joints, especially during final assembly due to corrosion at the vital points of connection.

In accordance with the invention, the metal commutator ring is first provided with diagonal fine slots in the inner edge thereof, one slot for each fine wire. A fine wire is then inserted in each of the slots, and then sequentially fuse welded in place by pressing an electrode on the edge of the slot and supporting the ring on a second electrode while conducting electric welding current between the electrodes. The wire ends are thus fusion welded in place under heat and pressure in a simple operation.

Accordingly it is the principal object of this invention to provide novel ways and means to improve the quality of the connected joints in fine wire-commutator ring constructions.

Another object of this invention is to provide a novel commutator ring that is simple and easy to assemble by welding the ends of the fine coil wires to the commutator ring.

Still another object of the present invention is to provide a novel and simple way to assemble a commutator ring to the coil ends of an armature.

These and other objects and many of the attendant advantages of this invention will be readily appreciated as the same becomes better understood by reference to the following detailed description when considered in connection with the accompanying drawings, wherein FIG. 1 is a cross-sectional view of a metallic commutator;

Figure 1:
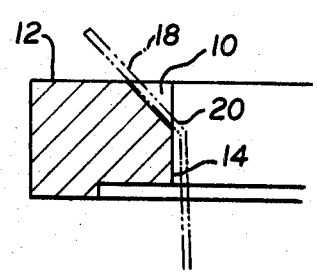
Figure 2:
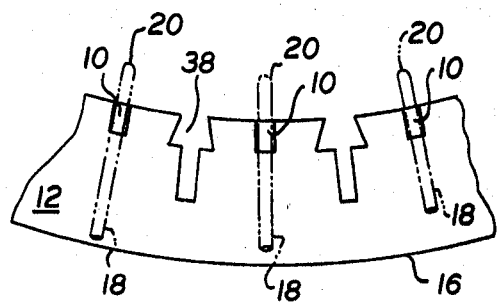
FIG. 2 is a fragmentary view inside elevation thereof.
Figure 3:
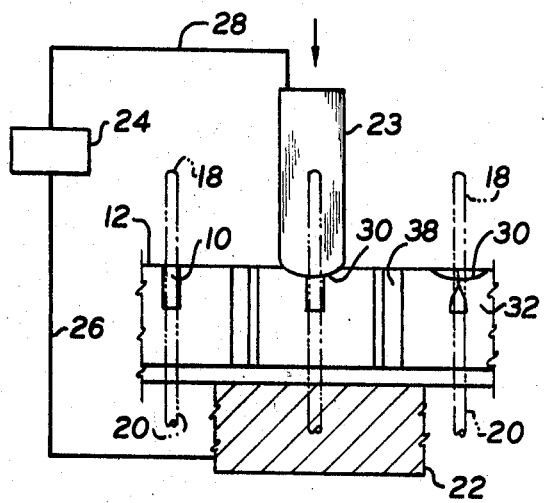
FIG. 3 is a schematic elevational view of the welding setup.

Referring now to the drawings, wherein like reference numerals designate like parts throughout the figures thereof, there is shown in FIGS. 1, 2 and 3 a plurality of fine diagonal slots 10 which are cut at 45° in the corner between upper face 12 and side 14 of a commutator member 16 composed of a metal such as brass. A portion 18, in this case the end, of a fine wire 20 of copper is then inserted in one of the slots 10, and fits snugly therein, preferably by friction. The member 16 and wire 20 are placed in an electric welding machine comprising a lower electrode 22, and an upper electrode 23 which is pressed downwardly on the upper face 12 of member 16 in the area above slot 10 containing wire portion 18, while electric welding current from an electric power source 24 flows between electrodes 22 and 23. The power source 24 is connected to the electrodes 22 and 23 by leads 26 and 28, respectively. Such flow of welding current and pressure of the electrode against the face 12 of the member 16, in the direction of area over the slot 10, causes the adjacent metal to fuse, welding the end portion 18 of the wire 20 in place at 30 to the member 16.

Figure 4:
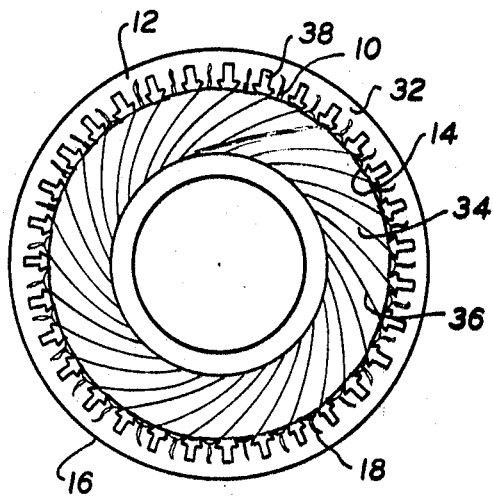
FIG. 4 is a top plan view of a stator and commutator ring assembly prior to welding the ends of the fine coil wires to the ring.

As shown in FIG. 4, a commutator ring 32 composed of a nonmagnetic electrically conductive metal is provided with equally spaced fine slots 10, one for each fine coil wire of a stator 34. Such wires, which correspond to wire end portion 18 in FIG. 1, are inserted in their respective slots 10 in the ring 32. In this example, the slots are located in the upper-inner corner edge of the ring 32, between the upper face 12 and inner periphery 14, and the fine wire ends come directly from the coils 36 constituting the windings of an armature. Also, in this case, keystone-shaped slots 38 are provided in the ring 32 in addition to the fine slots 10, there being a fine slot 10 located between each pair of keystone-shaped slots 38. Such slots 38 are cut through so that the commutator is segmented after the commutator ring 32 has been connected to each of the wire ends and the commutator ring and armature have been potted in a conventional fashion. After segmenting, the armature is again potted for electrical insulation of the segments.

Figure 5:
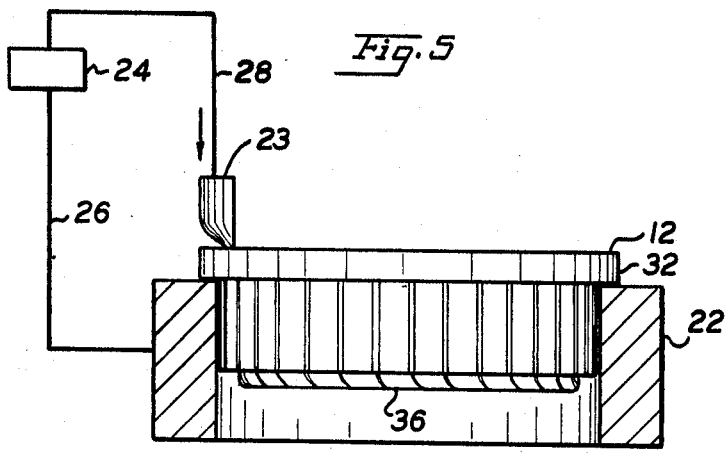
FIG. 5 is a view similar to FIG. 3 of the ring-wire welding setup.

As shown in FIG. 5, the welding apparatus comprises the lower annular electrode 22 and the upper electrode 23 which is pressed in the direction of the arrow on the upper face 12 of ring 32, as welding current is conducted to the electrodes 22 and 23, through leads 26 and 28 from the electric power source 24. After each fusion operation, the welding machine may be programmed for automatic rotation of the armature and commutator such that the slot adjacent the fused slot is positioned under the electrode 23 until all the coil leads have been welded to the armature. Thereafter the assembly is potted, the commutator segmented, and the segmented commutator and armature potted a second time, as described above.

It should be understood that the foregoing disclosure relates to only a preferred embodiment of the invention and that it is intended to cover all changes and modifications of the example of the invention herein chosen for the purposes of the disclosure which do not constitute departures from the spirit and scope of the invention.

I claim:
1. A method of connecting a fine wire from an armature to a metal commutator ring member having a corner, comprising
   cutting a fine diagonal slot in said member at said corner,
   inserting a portion of said fine wire in said slot, and
   fuse welding said wire portions in place by applying a pressure and an electrical current to the sides of said slot thereby fusing the sides of said slot around said wire portions.

2. A method as defined in claim 1, in which
   said fine slots are located in the corner of the outer face and inner periphery of said ring,
   said fine wire portions are the terminals of the coils in an armature and
   a corresponding slot is provided for each fine coil wire terminal.

3. In combination with an armature and commutator apparatus of the type wherein an armature has a plurality of coils and said commutator is comprised of a nonmagnetic segmented ring, each segment being electrically insulated from each other segment, the improvement which comprises:
   each segment having a fine diagonal slot extending from a corner of the outer face and inner periphery of said segment, and
   a wire terminal from one of said coils fuse welded therein by passing an electric current and simultaneously applying pressure to the sides of said slot.